US006553270B1

(12) United States Patent
Houle et al.

(10) Patent No.: US 6,553,270 B1
(45) Date of Patent: Apr. 22, 2003

(54) PROACTIVE CONTROL OF A PROCESS AFTER THE BEGINNING OF A DESTABILIZING EVENT

(75) Inventors: Alain Christian Houle, Greenville, WI (US); Michael Earl Pennings, Appleton, WI (US); Andrew Norman, Appleton, WI (US); Glen Everett Lashbrook, Neenah, WI (US); John Gerard Hein, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/345,037

(22) Filed: Jun. 30, 1999

(51) Int. Cl.[7] .............................................. G05B 13/02
(52) U.S. Cl. ........................... 700/54; 700/71; 700/110; 700/124; 700/129; 702/179; 702/180; 702/183
(58) Field of Search .............................. 700/30–32, 54, 700/71, 110, 124, 129, 57; 702/86, 179, 183, 180

(56) References Cited

U.S. PATENT DOCUMENTS 3,774,016 A * 11/1973 Sterns et al. ............. 235/151.1

(List continued on next page.)

FOREIGN PATENT DOCUMENTS

| CA | 2044792 | 5/1992 | ............ G05D/5/04 |
| EP | 0 485 691 B1 | 8/1994 | ............ B26D/5/34 |
| EP | 0 657 852 A2 | 6/1995 | ............ G06T/1/20 |
| EP | 701138 A2 * | 3/1996 | ........... G01R/13/34 |
| JP | 9081233 A | 3/1997 | ........... G05B/23/02 |
| WO | WO 93/07445 | 4/1993 | ........... G01B/21/14 |
| WO | WO 00/40194 | 7/2000 | ........... A61F/13/15 |

OTHER PUBLICATIONS

*Acquiring and Displaying Images*, COGNEX, pp. 34–35, 136–138, 143, 146–148, 153–154, and 530. Date unknown.

"User's Manual Model 1012," *Kodak Ektapro EM Motion Analyzer*, Eastman Kodak Company, 1990, pp. 1.1–7.9.

Primary Examiner—Wilbert L. Starks, Jr.
Assistant Examiner—Crystal J. Barnes
(74) Attorney, Agent, or Firm—Wilhelm Law Service; Thomas D. Wilhelm

(57) ABSTRACT

Apparatus and methods controlling a process producing segments of product wherein a destabilizing event of a particular type periodically destabilizes the process, resulting in product or process deviation from a target parameter associated with a number of segments of the product, from segment number 1 to segment number n. The method associates, with respective ones of the n units of product, deviation amounts corresponding to historical deviation amounts for the respective so-numbered units of product in past occurrences of the particular type destabilizing event, and applying to selected ones of the n segments of product correction factors derived from respective associated historical deviation amounts for the respective units of product, thereby making pro-active adjustments to respective ones of the n units of product, upon occurrence of the destabilizing event. Preferred methods include applying the correction factors to each of the n units of product. Preferred correction factors are registration factors. In preferred sets of adjustment instructions, at least some of the adjustment instructions include elements derived from vertical analysis and from horizontal analysis, of deviation data. The method is preferably applied to manufacturing processes producing discrete units of absorbent article product for personal care use in absorbing body exudates. The invention contemplates combining and/or modifying up to 10, in some cases up to 20 or more deviation profiles, and thereby obtaining a representative composite correction profile up-date element, before updating the correction profile.

30 Claims, 4 Drawing Sheets

U.S. PATENT DOCUMENTS

| | | | |
|---|---|---|---|
| 4,514,846 A | 4/1985 | Federico et al. ............... 371/16 |
| 4,837,715 A | 6/1989 | Ungpiyakul et al. ......... 364/552 |
| 5,045,135 A | 9/1991 | Meissner et al. .............. 156/64 |
| 5,138,377 A | 8/1992 | Smith et al. ................. 355/207 |
| 5,195,029 A | 3/1993 | Murai et al. ................. 364/184 |
| 5,200,779 A | 4/1993 | Nawata ....................... 355/206 |
| 5,218,406 A | 6/1993 | Ebner ......................... 355/205 |
| 5,235,515 A * | 8/1993 | Ungpiyakul et al. ......... 364/469 |
| 5,239,547 A | 8/1993 | Tomiyama et al. ......... 371/16.4 |
| 5,251,273 A | 10/1993 | Betts et al. .................... 382/57 |
| 5,286,543 A | 2/1994 | Ungpiyakul et al. ........... 428/74 |
| 5,315,697 A | 5/1994 | Nagamatsu ................. 395/155 |
| 5,333,062 A | 7/1994 | Hara et al. ................... 358/437 |
| 5,359,525 A * | 10/1994 | Weyenberg ................. 364/469 |
| 5,365,310 A | 11/1994 | Jenkins et al. .............. 355/202 |
| 5,388,252 A | 2/1995 | Dreste et al. ................ 395/575 |
| 5,388,618 A | 2/1995 | Decock ....................... 139/1 R |
| 5,392,095 A | 2/1995 | Siegel ......................... 355/200 |
| 5,408,405 A * | 4/1995 | Mozumder et al. ......... 364/151 |
| 5,437,278 A | 8/1995 | Wilk ........................ 128/653.1 |
| 5,452,438 A | 9/1995 | Umeda et al. ............... 395/180 |
| 5,455,764 A * | 10/1995 | Meihofer .................... 364/161 |
| 5,467,355 A | 11/1995 | Umeda et al. .......... 364/571.04 |
| 5,486,998 A * | 1/1996 | Corso ........................... 700/32 |
| 5,490,089 A | 2/1996 | Smith et al. ............ 364/514 R |
| 5,564,005 A | 10/1996 | Weber et al. ................ 395/161 |
| 5,619,445 A | 4/1997 | Hyatt ........................... 365/45 |
| 5,659,467 A | 8/1997 | Vickers ....................... 364/138 |
| 5,659,538 A * | 8/1997 | Stuebe et al. ........... 364/469.02 |
| 5,694,528 A | 12/1997 | Hube ......................... 395/113 |
| 5,838,595 A | 11/1998 | Sullivan et al. .............. 364/578 |
| 5,841,676 A | 11/1998 | Ali et al. ..................... 364/552 |
| 5,862,054 A | 1/1999 | Li .......................... 364/468.28 |
| 6,253,159 B1 * | 6/2001 | Bett et al. ...................... 702/85 |
| 6,260,188 B1 * | 7/2001 | Ungpiyakul et al. ............ 717/1 |
| 6,266,436 B1 * | 7/2001 | Bett et al. .................... 382/141 |
| 6,473,658 B1 * | 10/2002 | Brose et al. .................... 700/31 |
| 6,477,471 B1 * | 11/2002 | Hedstrom et al. ............. 702/34 |

* cited by examiner

PROACTIVE CONTROL OF A PROCESS AFTER THE BEGINNING OF A DESTABILIZING EVENT

BACKGROUND

This invention relates to apparatus and methods for automatically monitoring and adjusting manufacturing processes, for example, processes which produce an ongoing stream of outputs such as discrete absorbent articles, for example disposable diapers, effective to absorb body fluids. Such absorbent article products are typically fabricated as a sequence of work pieces being continuously processed on a continuous web and/or continuous processing line of fabrication and assembly machines.

Such absorbent article product generally comprises an absorbent core confined between a moisture impervious baffle of e.g. polyethylene and a moisture pervious body side liner of e.g. non-woven fibrous material. The absorbent articles are typically made by advancing a web of either baffle or body side liner material along a longitudinally extending path, applying the absorbent core to the advancing web, and then applying the second web over the combination of the advancing web and the absorbent core. Other elements such as elastics, leg cuffs, containment flaps, waste bands, and the like are added as desired for the particular product being manufactured, either before, during, or after, applying the second web. Such elements may be oriented longitudinally along the path, or transverse to the path, or may be orientation neutral. As added, such other elements are typically registered on the absorbent article in one or both of the with machine direction and the cross machine direction.

Typical such manufacturing processes are designed to operate at steady state at a pre-determined set of operating conditions. A typical such process has a beginning and an end, and has a start-up period corresponding with the beginning of the operation of the process and a shut-down period corresponding with the end of the operation of the process. The start-up period of the process generally extends from the initiation of the process to the time the process reaches specified steady state conditions. The shut-down period of the operation generally extends from the time the process leaves steady state conditions to the termination of operation of the process.

While the process is operating at steady state conditions, the result desired from the process Is desirably and typically achieved. For example, where the process is designed to produce a certain manufactured good such as disposable diapers, acceptable manufactured goods are normally produced when the process is operating at specified steady state conditions.

As used herein, "steady state" conditions represents more than a single specific set of process conditions. Namely, "steady state" represents a range of specified process conditions which correspond with a high probability that acceptable goods will be produced, namely that the products produced will correspond with specified product parameters.

Known statistical models and control models for controlling the manufacturing process are based on assumptions that the goods produced during operation of a given such process represent a single homogeneous population of goods. The focus of such statistical models and control models is based on steady state conditions.

However, actual operation of many manufacturing processes, including highly automated processes, typically includes the occurrence of periodic, and in some cases numerous, destabilizing events. A "destabilizing event" is any event which upsets, interferes with, or otherwise destabilizes the ongoing steady state characteristics of either process parameters or unit-to-unit product parameters. A typical such destabilizing event is one which either causes unacceptable product to be made, or which causes the process controller to recognize and/or report an anomalous process condition, or both.

A typical manufacturing automatic process control system can make adjustments to the process in real time based on horizontal analysis such as averaged data collected from a pre-determined quantity, e.g. a predetermined number of serially-arranged units of work pieces currently being processed. In addition, such typical manufacturing automatic process control system can automatically cull product according to predetermined criteria upon the occurrence of a pre-defined triggering event that e.g. inherently produces at least a minimum quantity of defective product. Thus, depending on the nature and severity of a given destabilizing event, the process controller may respond to the destabilizing event by culling product and/or by making adjustments to one or more process conditions, for example, shutting down the operation, speeding up or slowing down the operation, changing one or more of the other operating parameters, sounding an alarm to alert an operator, or the like.

Upon the occurrence of such destabilizing events, the data representing products fabricated by such manufacturing operation may begin moving away from target conditions whereupon corrective action should be taken in the manufacturing operation; or the data may move outside acceptable specifications whereby the respective units of product should be culled from the product stream. However, such control systems typically collect a number of data points from sequentially arranged units of product in the stream of goods being produced, and compute a data average, before taking corrective action. In the meantime, defective product may be produced, and may subsequently be packaged for shipment.

A variety of possible events in the manufacturing operation can cause the production of absorbent articles which fall outside the specification range. For example, stretchable materials can be stretched less than, or more than, desired. Elements can become misaligned relative to correct registration in the manufacturing operation. Timing between process steps, or speed of advance of an element, can become out-of-tolerance. If such non-catastrophic deviations in process conditions can be detected quickly enough after the deviation from target begins to show up in the product, typically process corrections can be made, and the variances from target conditions can accordingly be reduced, without having to shut down the manufacturing operation and without having to cull, and thereby waste, product.

In some cases, the changes are so severe, or happen so quickly, that process corrections based on such anomalies detected in the product concurrently being produced are insufficient to avoid production of defective product which must be culled.

Further, where the anomalous condition is inherently temporary and short term, by the time automatic corrective action based on currently collected anomalous data, namely horizontal analysis, can be implemented, the temporary time period during which the anomalous behavior occurs may have expired. In such event, the corrective action is applied to non-defective work pieces, risking the possibility of creating defective work pieces that would have, but for the corrective action, been within acceptable specifications.

Exemplary of destabilizing events of interest in the invention are, for example, splices in any of the several materials being fed into the process, web breaks, defective zones in an input material, the start-up period, the shut-down period, unplanned start-up and unplanned shut-down periods, and the like. Typical responses to such more drastic anomalous destabilizing events might be culling product from the manufacturing line, sending one or more corrective control commands to control actuators on the process line, sounding an alarm, slowing down the processing line, shutting down the process line, and the like.

A variety of automatic product inspection systems are available for routine ongoing automatic inspection of product being produced on a manufacturing line and for periodically and automatically taking samples for back-up manual evaluation. Indeed, periodic manual inspection of product samples is still important as a final assurance that quality product is being produced.

Where the process produces product wherein one or more elements is mis-registered on The product, early correction of the defective mis-registration is highly desirable in order to minimize the amount of defective product which is produced. While existing control systems can detect mis-registration, such control systems take action only after collecting enough sample data points from sequentially-arranged units of product to develop a reliable average for the registration data. Moreover, where the mis-registration characteristic represents a rapidly changing parameter such as at start-up, at shut-down, or at a splice, the calculated average is of limited value until the parameter of interest becomes relatively stable. Yet further, known control systems are powerless to predict the degree and direction of mis-registration, or to take any pro-active corrective action with respect to such mis-registration. Rather, such systems rely on first collecting data from the currently and sequentially mis-registered product, and averaging the respective data, by which time the units of product, used to generate the data, may have exited the manufacturing process.

Body fluid absorbing personal care absorbent articles such as are of interest herein for implementation of the invention are typically manufactured at speeds of about 50 to about 1200 articles per minute on a given manufacturing line. Preferred speeds are between about 300 and about 1000 articles or other units of product per minute. Accordingly, it is impossible for an operator to manually inspect each and every article so produced.

A significant problem with known control systems is that they are designed for and focused on making process adjustments based on horizontal analysis, namely calculating a representative parameter based on data collected from a sample of units of product arranged in sequence on the production line, and subsequently generating corrective instructions to the production line machines, based on the calculated representative parameters. Such conventional control systems do not take into account certain predictive characteristics regarding specific product segments, or units of product, which can be gleaned for each unit of product based on its relationship to a destabilizing event.

As a result, while existing statistical control models may be rather efficient at identifying and culling defective product resulting from random or unpredictable anomalous conditions in the process, or resulting from a minor deviation from steady state conditions, when the process experiences a destabilizing event, known statistical control models are unable to anticipate or predict, and correct for, defective product characteristics based on past product behavior corresponding to respective such destabilizing events. By corollary, such control models are unable to take corrective action until off-target product is in fact produced, and recognized as being off target.

Thus, known statistical control models are, for example, unable to adjust registration at start-up based on mis-registration which occurred during a previous start-up.

It is an object of this invention to provide a method of pro-actively making process parameter adjustments, such as registration adjustments, upon occurrence of a destabilizing event.

It is another object to make such process adjustments based on historical data collected during one or more previously-occurring such destabilizing events.

It is still another object to make such adjustments specific to individual units of the product, e.g. individual work pieces, based on the amount of mis-registration recorded for the individual units of product in respective previously-occurring such destabilizing events.

It is a further object to issue corrective adjustment commands before any defective product is produced.

Still another object is to collect data, and generate a deviation profile for one or more parameters representative of the effect of a respective destabilizing event.

Yet another object is to modify the deviation profile and to thereby create a correction profile element from the deviation profile, for the given type of destabilizing event.

A still further object is to invert the deviation profile, and to modify the inverted deviation profile in developing the correction profile element, and accordingly a new correction profile.

A further object is to apply the correction profile to a subsequent occurrence of the type destabilizing event for which the data was collected and averaged.

A further object is, while applying the correction profile, sensing and recording new registration deviation data resulting from application of the correction profile.

Other objects are achieved in, after recording the new registration deviation profile, inverting the new deviation profile to thereby develop a new correction profile element, and applying the new correction profile element to the existing correction profile, thus to create a new, next generation correction profile which takes into account the deviations used in developing the correction profile element.

Yet other objects are obtained by, upon occurrence of such pre-defined destabilizing event, applying the then current correction profile, and sensing and recording a corresponding registration deviation profile pertaining to the respective current destabilizing event; and periodically incorporating adjustments into the correction profile based on the registration deviations recorded from previous such destabilizing events.

SUMMARY

This invention contemplates a method of controlling a process producing segments of product and wherein a destabilizing event of a particular type periodically destabilizes the process, resulting in a deviation from a target parameter in a number of segments of the product, from segment number 1 to segment number n. The method comprises upon occurrence of the particular type of destabilizing event, associating with respective ones of the n segments of product, deviation amounts corresponding to historical deviation amounts for the respective so-numbered units of product in past occurrences of the particular type of destabilizing event; and applying to selected ones of the n units of product, correction factors derived from respective associated historical deviation amounts for the respective nth units of product, thereby making pro-active adjustments to respective ones of the n units of product, upon occurrence of the destabilizing event.

Preferred methods include applying the correction factors to each of the n units of product.

In exemplary embodiments, the method includes applying the correction factors as registration factors, to either or both of with machine direction registration and cross machine direction registration.

In preferred embodiments, the method includes, using a computing controller, computing correction factors for selected units, optionally uniformly spaced units, or each unit, using historical operating data from at least two previous occurrences of the destabilizing event and respectively developing a correction profile using the combination of the correction factors, for use upon occurrence of a future destabilizing event.

The method preferably includes computing separate and distinct correction factors for selected units, optionally uniformly spaced units, or each unit, to which such registration correction factor is to be applied, including deriving such correction factor from the same numbered nth unit in the previous destabilizing event or events, whereby each such correction factor is based on data derived from the respective nth unit of product past the destabilizing event, in such previous destabilizing event or events.

Preferably, the method is applied to a manufacturing process producing discrete units of absorbent article product for personal care use in absorbing body exudates.

Preferred embodiments of the invention include collecting deviation information from ones of the respective n units of product during subsequent occurrences of the destabilizing event and, based on the deviation information so collected, periodically making adjustments to the correction profile and applying the adjusted correction profile to ones of the respective n units of product at future occurrences of the destabilizing event.

In some embodiments, the method includes collecting and recording registration data for respective ones of the subsequent n units of product, and thereby obtaining fresh registration deviation data on multiple units of product, up to n units, for the destabilizing event, thus obtaining samples for up to n units of product, for respective ones of the n units of product, using the computing controller, automatically in real time computing a representative registration deviation based on the sample obtained for the respective nth unit of product, and thereby obtaining a registration deviation profile representative of the respective units of product associated with the respective destabilizing event, combining and/or modifying up to 10, in some cases up to 20 or more, of the deviation profiles, and thereby obtaining a representative composite correction profile up-date element for such type destabilizing event, upon obtaining the correction profile up-date element, adding the so-obtained correction profile up-date element to the registration correction profile, thus to obtain an up-dated registration correction profile, and applying the up-dated registration correction profile to a subsequent occurrence of the respective type destabilizing event, preferably including beginning to add the so-obtained correction profile up-date element to the correction profile no later than the n+20th unit, more preferably no more than the n+10th unit, of the last destabilizing event from which the correction profile element data was derived.

In other embodiments, the method includes collecting and recording registration data for respective ones of the subsequent n units of product, and thereby obtaining fresh registration deviation data on multiple units of product, up to n units, for the destabilizing event, thus obtaining samples for up to n units of product, for respective ones of the n units of product, using the computing controller automatically in real time computing a representative registration deviation based on the sample obtained for the respective nth unit of product, and thereby obtaining a registration deviation profile representative of the respective units of product associated with the respective destabilizing event, combining and/or modifying the deviation profile, and thereby obtaining a representative correction profile up-date element for such type destabilizing event, upon obtaining the correction profile update element, beginning to add the so-obtained correction profile up-date element to the registration correction profile, no later than the 2 nth unit of the last destabilizing event from which the correction profile element data was derived, thus to obtain an up-dated registration correction profile, and applying the up-dated registration correction profile to a subsequent occurrence of the respective type destabilizing event.

In a second family of embodiments, the invention contemplates a method of controlling a process producing discrete units of absorbent article product for personal care use and wherein a destabilizing event of a particular type periodically destabilizes the process, resulting in a deviation from a target parameter in a number of units of the product, from unit number 1 to unit number n. The method comprises operating the process, including continuing to operate the process upon occurrence of such type destabilizing events, x times, x being greater than 1, and upon occurrence of such destabilizing events, collecting and recording product data for respective ones of the subsequent n units of product, and thereby obtaining product deviation information on multiple units of product, up to n units of product, for each of the x such destabilizing events, thus obtaining up to x samples for each of the n units of product; for respective ones of the n units of product, computing a representative product deviation based on the samples obtained for the respective nth unit of product, from the x such destabilizing events, and thereby obtaining a product deviation profile representative of the product deviations of the respective units of product from a target parameter, and obtained from the x destabilizing events; modifying the deviation profile, and thereby obtaining a product correction profile element for such type destabilizing event, the correction profile including a correction for each of the n units of product for which a product deviation indication was obtained; adding the so-obtained product correction profile to any pre-existing product correction profile used in collecting the sample, thus to obtain an up-dated product correction profile; and applying the up-dated product correction profile to a subsequent occurrence of the respective type destabilizing event.

In preferred embodiments, the method includes, while applying the up-dated product correction profile to a subsequent such destabilizing event, collecting product deviation data for up to respective n units of product, and using the so-collected deviation data to further up-date the product correction profile, for example by computing of the product deviations by averaging the deviations recorded for the respective nth units of product or work pieces.

The method may include collecting product deviation information from ones of the respective n units of product during subsequent occurrences of the destabilizing event, and periodically making adjustments to the product correction profile based on the product deviation information so collected.

Yet another family of embodiments comprehends a method of controlling a process producing product in discrete product segments. The method comprises operating the process, including continuing to operate the process upon occurrence of a destabilizing event, and collecting and recording process performance data for respective ones of the subsequent n units of product, and thereby obtaining process performance deviation information on multiple units of product, up to n units of product, for such destabilizing event, thus obtaining samples of the performance data for up to the n units of product; for respective ones of the n units of product, computing a representative performance deviation based on the sample obtained for the respective unit of product, and thereby obtaining a process performance deviation profile representative of the respective units of product; modifying the deviation profile, and thereby obtaining a process performance correction profile element for the destabilizing event, including correction for each of the n units of product for which a process performance deviation indication was obtained; incorporating the so-obtained performance correction profile element into any pre-existing correction profile used in collecting the samples, thus to obtain an up-dated performance correction profile; and applying the up-dated performance correction profile to a subsequent occurrence of respective type destabilizing event.

In preferred embodiments, the method includes applying the performance correction profile to each of the n units of product.

The invention yet further comprehends apparatus for controlling a process producing segments of product and wherein a destabilizing event of a particular type periodically destabilizes the process, resulting in a deviation from a target parameter in a number of segments of the product, from segment number 1 to segment number n. The apparatus comprises a manufacturing line comprising a plurality of machines manufacturing the product; a computing controller effective, upon occurrence of the particular type of destabilizing event, to associate with respective ones of the n segments of product, deviation amounts corresponding to historical deviation amounts for the respective so-numbered units of product in past occurrences of the particular type of destabilizing event, and to apply to respective nth ones of the n units of product, correction factors derived from respective associated historical deviation amounts for the respective nth units of product; one or more detection devices detecting one or more parameters with respect to the process or product being produced by the process; and one or more actuation devices effecting adjustments to the machines in response to the correction factors developed from deviation amounts detected in one or more previous destabilizing events, thereby to make pro-active adjustments to respective ones of the n units of product, upon occurrence of the destabilizing event.

Figure 1:
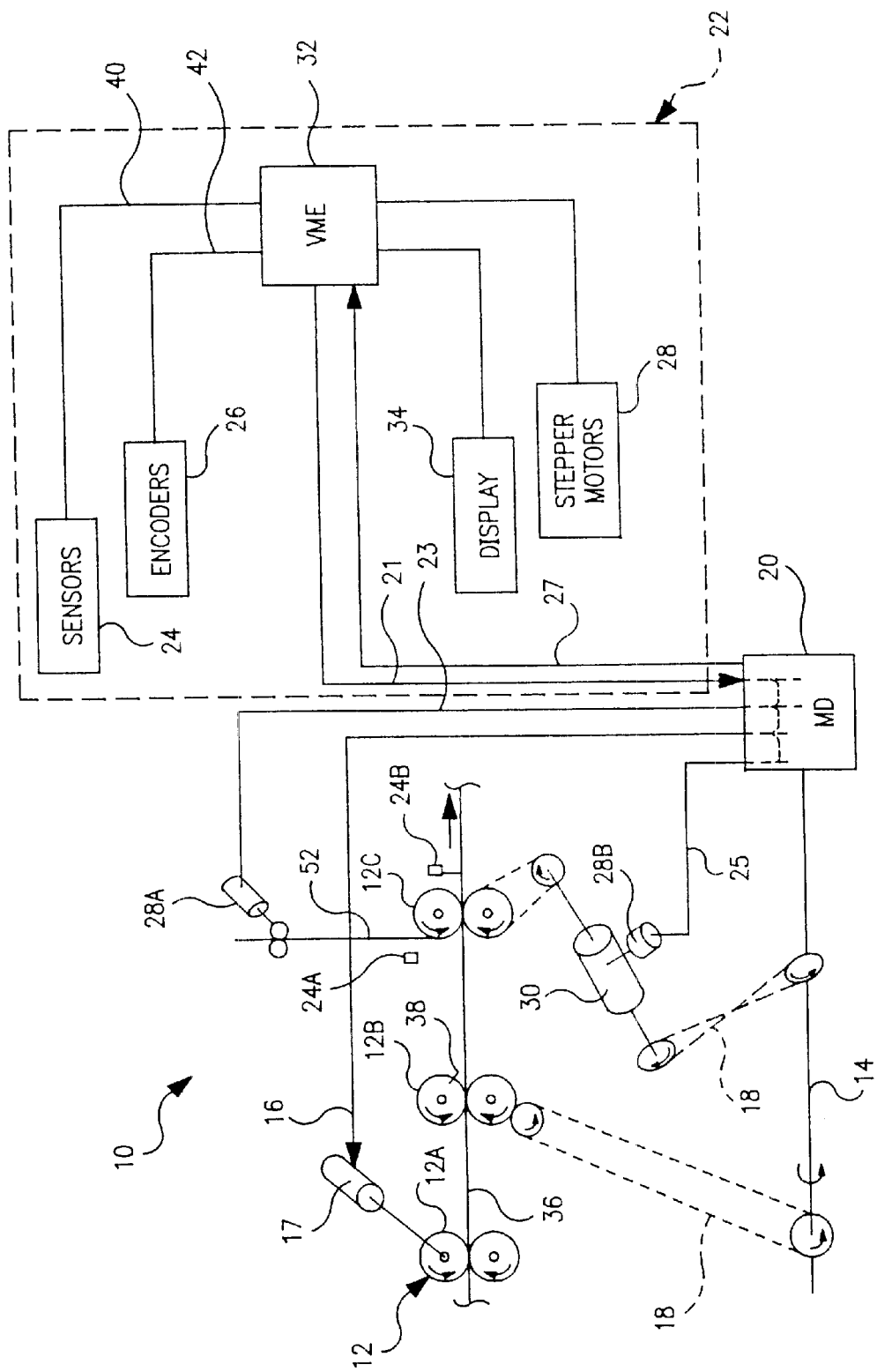
FIG. 1 is a block representation of a portion of a manufacturing line utilizing control system and method of the invention

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

FIG. 1 illustrates briefly a portion of a manufacturing line 10 to be controlled by control system, and control methods, of the invention. Manufacturing line 10 includes a plurality of work stations where work is performed on work pieces by manufacturing machines 12 such as machines 12A, 12B, 12C. Primary power is brought to the machines through a mechanical drive line shaft 14 and optionally by use of one or more electrical or other non-mechanical conductors and/or signal lines 16. Conductors or lines 16 can be, for example, electric cable, hydraulic lines, pneumatic lines, or the like, powering or controlling power to corresponding operating devices such as control motor 17.

Power is transferred from mechanical drive line shaft 14 to the machines at the various work stations by any of the well known transfer mechanisms such as drive belts or drive chains 18 or transmissions, gear boxes, or auxiliary drive shafts. Drive shaft 14 is powered by machine drive 20. In addition to providing primary power to the line shaft, machine drive 20 also provides basic speed differentials between various ones of the working machines on manufacturing line 10, through various speed control devices such as control motor 17.

Inspection and control system 22, in combination with machine drive 20, employs a plurality of detection devices such as sensors 24 and encoders 26, as well as a variety of control elements such as stepper motors 28 and transmissions 30, all controlled by, for example and without limitation, a VME based digital computer controller 32. In some cases, control system 22 controls the control elements directly. In other cases, control system 22 sends control instructions to machine drive 20 such as through communication line 21 whereupon machine drive 20 sends a suitable instruction signal to the actuator, such as through line 16 to motor 17 or line 23 or 25 to respective stepper motors 28A, 28B. In addition to generating control commands, controller 32 feeds an optional operator display 34 which provides an operator of the manufacturing line with a visual representation of selected data aid other information corresponding to the ongoing activities occurring on the manufacturing line. Correspondingly, machine drive 20 sends drive information to controller 32 through communication line 27.

The nature of the work performed by the various manufacturing machines 12 is of little consequence to the applicability of the invention. What is important is that the machines perform work which can be automatically inspected e.g. by sensors and the like for conformity with one or more pre-determined parameter standards.

For example and without limitation, manufacturing line 10 may represent a line of machines which assemble absorbent articles for use as personal care items, such as diapers or other personal care hygiene products. In that context, machine 12A may comprise a pair of draw rolls which draw a continuous web 36 along the manufacturing path at a controlled beneficial rate or speed. Machine 12B illustrates a pair of rolls wherein a first upper roll includes a cutting device 38 and a second lower roll serves as a cutting anvil against which the cutting device makes a cut or cuts on the web, or on one or more elements on the web. Machine 12C may represent a pair of rolls which act to place, or facilitate placing, an element such as a waist band elastic on web 36. These and other work stations are well known in the personal care article art for fabricating absorbent personal care articles.

While a wide variety of machine drives 20 can be used for providing primary drive power to a wide variety of manufacturing equipment operating assembly processes in which the invention can be implemented, an exemplary such machine drive is available from Reliance Electric of Cleveland, Ohio, as an AUTOMAX®.

Where one or more elements is positioned relative to another element during the manufacturing operation, the registration of the elements with respect to each other may be important to the acceptability of the product upon completion of the work being performed on that product by the manufacturing operation. For example, and now referring to a process manufacturing disposable diapers, various elements are placed on a continuous web 36 which proceeds along the manufacturing line. Thus, any or all of such elements as an absorbent core, leg elastics, leg cuffs, containment flaps, waist elastics, securement ears, and the like, may be placed on continuous web 36, or on each other. In addition, one or more additional continuous webs may be placed on web 36, either on or under one or more of the above mentioned such elements. The above elements do not represent an exhaustive list of elements which may be assembled in a disposable diaper. Rather, they represent typical such elements which may be used to Illustrate the invention.

Similarly, the invention can be used with manufacture of other absorbent articles, and with a wide variety of articles outside absorbent article technology.

In addition, the invention disclosed herein can be used with manufacture of bulk commodities wherein the resultant product is produced as bulk product, so long as portions of the product can be suitably identified for inspection and control purposes.

Inspection and control system 22 is designed to provide control generally to the power and speed provided by machine drive 20 or to other machines or systems cooperating with machine drive 20. To that end, a variety of sensors and controls are positioned along manufacturing line 10 so as to interact with the product being manufactured as well as to interact with machines 12 directly, and optionally to interact with the product and/or machines through machine drive 20. The primary control center of the inspection and control system is the VME-based computer controller 32. Other suitable computer control platforms can similarly provide the functions illustrated here by the VME-based computer controller. Accordingly, the invention is not limited to VME-based computer controllers, but can be practiced on other computer platforms so long as the necessary elements of logic analysis are available.

A wide variety of detection apparatus can be used in the invention. For example, sensors 24 are located along the manufacturing line at positions selected to enable the sensors to detect the condition of the product in relationship with a desired parameter such as registration. Typical sensors 24 include photo eyes, proximity sensors, laser sensors, infrared sensors, microswitches, vision systems, luminescence detectors, color sensors, and line scan cameras. Other sensors can be used as well so long as such sensors can be set up to suitably communicate with controller 32.

For example, registration can be sensed with respect to the machine direction, that is along the direction being traversed by web 36 along the manufacturing line. Registration can also be sensed with respect to cross machine direction, e.g. perpendicular to the direction being traversed by the web along the manufacturing line.

The actual property, and/or the condition of such property, to be sensed is determined by the user when the manufacturing operation is being set up or modified. Accordingly, a wide variety of conditions can be sensed by sensors 24, and reported back to the VME computer controller through communication lines illustrated in FIG. 1 as a single line 40.

A variety of encoders 26 can also be set up along the manufacturing line to provide position and relative position information to controller 32, through communication lines illustrated in FIG. 1 as a single line 42.

Regarding, for example, a manufacturing line producing personal care absorbent articles such as diapers, as diaper elements are placed on the web, the diapers are developed on the web as individual work pieces arranged generally end-to-end or side-to-side, with web 36 being a continuous carrier web for such work pieces, and wherein respective elements of web 36 are retained as parts of the work pieces that are eventually separated into individual discrete products upon completion of assembly of the respective absorbent article diapers.

In such manufacturing line producing disposable diapers, a sensor 24 can be set up to sense a particular registration parameter on each work piece, such as with machine direction registration or cross machine direction registration. The sensing signal is then transmitted to controller 32 through a communication line 40. Controller 32 then sends adjustment signals to appropriate adjustment or actuation devices such as stepper motors 28 in order to make needed adjustments to line speed of one or more elements of the work pieces in order to maintain desired, or at least acceptable, registration of the specific elements with respect to each other, or to bring the elements into acceptable registration with respect to each other.

For example, machine 12C can represent a work station where waist band elements are placed on respective diaper work pieces, in registration with e.g. an absorbent core, and/or in registration with what will become the side edges of the diaper when the diaper is eventually severed from the continuous web. Such waist band elements are typically fed to the manufacturing line as a continuous web or strand of waist band material 52. A specified length of such waist band material is cut from such continuous web or strand at appropriate locations along the web of waist band material, and placed on web 36, so as to develop waist bands on the respective work pieces being formed on web 36.

When the continuous web of waist band material is exhausted, a new web of waist band Material is spliced into the feed stream of waist band material and fed to the respective work station. As the splice arrives at the respective work station, the splice represents a destabilizing event that causes one or more out-of-tolerance work pieces to be produced. Other elements placed on, or otherwise interacting with the web, or other events, can similarly cause destabilizing of web 36 and the work pieces defined thereon, and corresponding production of out-of-tolerance work pieces.

Sensor 24 such as sensor 24A can be positioned, for example, on the manufacturing line at the work station represented by machine 12C, to inspect and sense the position of the waist band as each waist band is cut from material 52 and is placed on the respective work piece. As each waist band is sensed by sensor 24A, the position of the respective waist band is communicated to controller 32. Based on the position information so communicated to controller 32, controller 32 issues adjustment commands to appropriate control devices to make indicated adjustments to the process in order to provide waist bands that are properly positioned in subsequently-processed work pieces. Namely, the controller processes position information from work pieces that have already received waist bands, using horizontal analysis, to cause the machines to adjust placement of waist bands on subsequently-processed work pieces.

Controller 32 can concurrently be collecting, analyzing, and acting upon data pertaining to a variety of parameters and collected from a variety of detection devices concurrently associated with a variety of work pieces. Typically, controller 32 is programmed to make adjustments only after having received a suitable number of data readings from e.g. a sensor 24 indicating that an adjustment needs to be made. Typically, a suitable mathematical model of a number of readings will be used as the basis for issuing adjustment instructions. For example, the data may be averaged, or a median reading may be used as the basis for issuing adjustment instructions. Severely aberrant readings may be discarded and not used in developing the mathematical model.

Data can be analyzed, and the mathematical model can be developed by controller 32, after each pertinent data point to the parameter of interest is received by controller 32. Thus, each data point can result in a new mathematical model being developed. Each such new mathematical model represents the latest available information for adjusting operation of the machines on manufacturing line 10 based on the units of product or work pieces, then being processed on the manufacturing line.

In the above described control process, controller 32 receives a continuing stream of data points, eventually receiving data points from each respective work piece processed on the processing line. Using the mathematical model, and screening out severely aberrant data points avoids making adjustments based on erroneous assumptions as to longevity of the aberration. The above horizontally analytical control process is also limited to making control adjustments based on properties of the most recently processed work pieces.

In addition, efficient use of such process is limited to time periods when the process is operating at or near a steady state condition, wherein process adjustments made in response to data received by the controller operates on work pieces experiencing a process environment which generally corresponds with the environment that existed when the respective data points were collected.

By contrast, where a destabilizing event is imposed on the process such as at start-up or shut-down, or when a web splice transits the manufacturing process, process conditions change so rapidly that issuing adjustment instructions based on e.g. averaging the data points implements the adjustment instructions on work pieces being processed in a much different work environment than the work pieces whose data is used as the basis of the adjustment instructions.

In general, under such conditions, destabilizing events are correlated with a product or process condition which is not present at steady state operation. Where the condition is not likely to be corrected without shut-down, or where correction will take considerable time, then a shut-down is preferred. The length of time during which the manufacturing operation remains shut down depends on how long it takes to correct for the condition.

Figure 2:
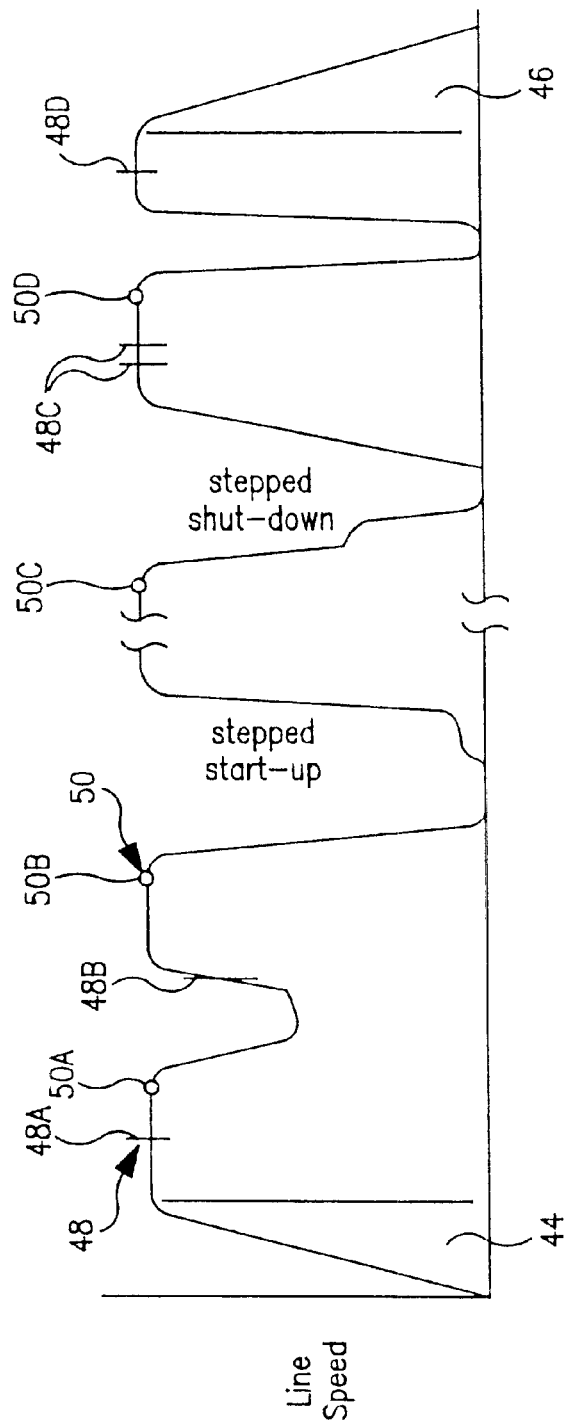
FIG. 2 is a graph illustrating the degree of achievement of specified steady state conditions, including destabilizing events that have little or no affect on line speed, as well as destabilizing events which do have significant affect on line speed.

FIG. 2 is a graph illustrating line speed of a manufacturing line in relationship to time along a representative continuum of processing operation. FIG. 2 represents an initial planned start-up period 44 and a planned terminal shut-down period 46. In addition, FIG. 2 depicts a first series of destabilizing events 48 which do not affect line speed, and a second series of destabilizing events 50 which do affect line speed. Destabilizing events that do not affect line speed can be, for example and without limitation, splices, a web wandering from a specified track centerline, light-weight in-feed material, heavy-weight in-feed material, drive speed inconsistencies, misapplied product elements, and the like. Generally, the destabilizing events 48 depicted in FIG. 2 have little or no affect on the line speed of the manufacturing operation.

FIG. 2 shows specifically a series of four destabilizing events 50A, 50B, 50C, and 50D, which do have significant affect on line speed, and wherein events 50B, 50C, and 50D result in the process line being temporarily shut down. Unless plans are changed during operation of the process, the initiation of planned routine terminal shut-down 46 is independent of the operation/existence of any otherwise destabilizing event.

Short term destabilizing events represent situations wherein the anomaly is corrected in a short period of time, for example no more than a few seconds, whereby the process can and should continue operating and acceptable product is again being produced within the short period of time.

Upon occurrence of destabilizing events that do affect line speed, the affect on the product is different from the affect when e.g. a splice passes through the manufacturing line. Referring to e.g. destabilizing event 48A, the affect on line speed, and thus on the process in general, is different from the affect when an event 48 occurs, wherein line speed is not greatly affected. Thus, according to the invention, each different type of destabilizing event should be treated differently. In addition, where the destabilizing event causes a non-steady state condition to exist, namely where the condition of the process, or the environment experienced by the work piece, is changing significantly such as at start-up or shut-down, data from even the most recently fabricated work pieces may be of little value in adjusting the manufacturing machines to account for the changes being imposed on them by the change in conditions.

Applicants have discovered that destabilizing events in a manufacturing operation can be classified in a relatively small number of classes, typically less than e.g. 3 classes for each manufacturing step being performed. Applicants have further discovered that when a destabilizing event occurs, the characteristics of work pieces subsequently produced follows a pattern specific to that type or class of destabilizing event. Three exemplary classes or types of destabilizing events might be, for example, start-up, shut-down, and passage of a splice through the process.

Regarding splicing, each different material which is spliced is typically treated as a separate class of destabilizing event. The number and identity of classes are determined according to the user's experience with the repeatability of the responses of the process to a specific type of destabilizing event.

As to each class of destabilizing events, the pattern of characteristic affects on the work pieces can be traced to the number of that work piece on the processing line, starting with number 1 as to the affected processing action after occurrence of the destabilizing event. Thus, when a particular class of destabilizing event occurs, the next work piece (work piece number 1) at a given work station is affected in a predictable manner by the destabilizing event. Similarly, the number 2, number 3, and so on work pieces each are affected in predictable manners, specific to the work piece number.

In accord with the inventors' discovery, the fact that the process responds similarly to each different class of destabilizing event, and specifically to each work piece by number, becomes the basis for making pro-active adjustments to the processing line when a destabilizing event occurs, separate from indicators of ongoing product parameters detected by e.g. sensors 24 or encoders 26.

In general, a work piece closely adjacent the destabilizing event has a relatively higher probability of being off target or out of specification, and the farther away from the destabilizing event is the unit of product being analyzed, the lower the probability that the unit of product will have been deleteriously affected by the destabilizing event such that defective product might be produced.

Units of product produced remote from the destabilizing event in time and distance have a low probability of being adversely affected by the destabilizing event, whereby the probability of such unit of product being defective is related primarily to the probabilities associated with steady state conditions and conventional control exerted by inspection and control system 22.

Closer to the destabilizing event, referring typically to those work pieces processed after the destabilizing event, the probability of the unit of product being defective is a combination of (i) the low probability of defect associated with steady state operation and (ii) the respective probability of defect associated with the destabilizing event. In some cases, for example a splice, the probability of producing at least one unit of defective material approaches 100 percent.

While commercially available statistical control models assume a single homogeneous population of the output of the process, having a generally uniform continuum of properties of the output population, the inventors herein propose that a more realistic representation of the population of outputs being produced by a representative manufacturing process in fact has two distinct and separately identifiable population segments. The first segment is that produced under steady state conditions. The second segment is that produced under the stress conditions associated with any one or more destabilizing events.

Since the overall population of units produced represents two separately identifiable and distinct population segments, applicants propose that the statistical control model used for automatically controlling production, sampling, culling, and the like, of units of product, should be adjusted so as to reflect a typical steady state control model only during existence of steady state conditions.

Accordingly, in the invention, for the remainder of the time, namely during and after the occurrence of destabilizing events, the conventional control model used for automatically controlling production of product, reflects the increased risk of producing defective, off-specification product proximate a destabilizing event.

The inventors' overall control model thus comprises both primary and secondary control model elements. The primary control model element assumes steady state conditions, and controls production on the basis of steady state assumptions. The secondary control model element, namely the vertical analysis control model described herein, adjusts certain selected ones of the operating conditions of manufacturing line 10 to compensate, or partially compensate, for the affect of the destabilizing event on the respective work pieces, work piece by work piece, in accord with the work piece number, related to the destabilizing event, based on data collected prior to the occurrence of the respective destabilizing event.

EXAMPLE

The working of the invention will now be illustrated in terms of a registration model related to a splice traversing The processing line and wherein the registration of an element, for example a strip 52 of stretchable waist elastic material being placed on web 36 at machine 12C, is controlled or adjusted, by the secondary control model.

The manufacturing operation produces disposable absorbent diaper articles as discrete units of product. The individual diaper units are arranged on web 36 such that the front and rear ends of respective sequential ones of the diapers abut each other in the processing line, and wherein the sides of the diapers correspond with the sides of web 36. Thus, the machine direction of the waist band strips placed on the work pieces extend across the width of web 36. The waist elastic is supplied to manufacturing line 10 as a continuous strip of stretchable material, unwound from a conventional unwind stand. The strip of waist elastic is fed to manufacturing line 10, and placed on web 36 such that the machine direction of the waist elastic strip extends across the width of web 36.

As the example starts, the process is operating at steady state. During such steady state operation, a splice is made in the waist band material as a parent roll of such material is exhausted and a new parent roll is brought on line to provide waist band material to the process. As the splice enters the manufacturing operation, a sensor 24A detects the splice and communicates the existence and location of the splice to controller 32.

A second sensor 24B monitors the relative position, namely in this example the with machine direction registration, of the waist elastic elements as the waist elastic elements are being placed on the work pieces. As each unit of product leaves machine 12C, the second sensor communicates to controller 32 the registration condition of the specific unit of product. Controller 32 is simultaneously receiving information from both the first and second sensors, as to each unit of product.

Controller 32 uses the beginning of the destabilizing event, as communicated from sensor 24A, to establish the time when the destabilizing event occurred, namely to start counting the n units or segments of product. The controller uses the information regarding registration of the waist elastic elements, as communicated from sensor 24B, to conduct a horizontal analysis of the deviation of the waist elastic position from a target position. Namely, the controller reads and retains the deviations as received, and calculates a running average, namely the average of the most recently received y number of readings, for example 5 readings, upon receipt of each reading. Controller 22 then sends corrective instructions to an appropriate actuator such as a stepper motor 28A, 28B, or transmission 30 through a suitable communication line, based on that horizontal analysis. The respective actuator takes corrective action to adjust the registration at machine 12C.

Meantime, no corrective action has been taken with respect to work pieces that traversed machine 12C before the corrective instructions are sent to the respective transmission 30 or other actuator, whereby any deviation in those work pieces, from target properties, remains uncorrected. As a result, deviations in the uncorrected work pieces may require culling the respective work pieces.

Meantime, according to the invention, the work piece-by-work piece deviations from target, communicated from sensor 24B are recorded and stored in memory, for subsequent vertical analysis, by controller 32 according to work piece number until such time as the system is again operating at steady state. Thus, controller 32 stores deviation data for the set of work pieces which is highly affected by the destabilizing event. The number n of work pieces for which data is recorded is generally pre-determined as a fixed number by the user of the invention. However, where adequate computer memory and computing capacity are available, n can be defined by controller 32 separately as to each destabilizing event and respective data set, when the data suggest that the work pieces are again approaching or at steady state conditions, whereupon controller 32 stops recording deviation data for that data set, for subsequent vertical analysis. In such case, the respective data sets typically have differing numbers n of recorded readings from data set to data set.

The next time a waist elastic splice is introduced into the system, controller 32 recognizes the splice as a second occurrence of the waist elastic destabilizing event, Takes the same horizontal analysis, and responds accordingly with instructions to a respective actuator based on the horizontal analysis.

Meantime, the work piece-by-work piece deviations from target, communicated from sensor 24B are again recorded and stored in memory by controller 32, for subsequent vertical analysis; the deviation data being stored and recorded for each work piece traversing the machine until such time as n readings have been recorded, or the system is again operating at steady state. Again, the deviation data is indexed in memory according to work piece number. Thus, controller 32 stores deviation data for the second set of work pieces which is significantly affected by the second occurrence of the respective type of destabilizing event. When the appropriate number of readings have been recorded, controller 32 stops recording deviation data for subsequent vertical analysis. The number of work pieces represented by the second data set may or may not be the same as the number of work pieces represented by the first data set, depending on the consistency with which the system returns to steady state operation after occurrence of the destabilizing event and whether the number n of recorded readings is open-ended or fixed.

Controller 32 makes a vertical association of the deviations recorded for this second occurrence of the destabilizing waist elastic splice, work piece by work piece, with the deviations recorded for the first destabilizing waist elastic splice. Namely, referring to the detection of the respective splice by sensor 24B, the next (number 1) work piece which traversed machine 12C during or after the first destabilizing event is associated in controller 32 with the number 1 work piece which traversed machine 12C during or after the second destabilizing event. The number 2 work pieces are similarly associated with each other; the number 3 work pieces are associated with each other; the number 4 work pieces are associated with each other, and so on, whereby the affect of the first splice on each work piece in the first set is associated respectively with the affect of the second splice on each work piece in the second set.

Once the second set of data is collected, the control methods of the invention can be implemented. However, it is preferred to defer implementing the control methods of the invention and to first collect additional data from additional occurrences of the specified type of destabilizing event, preferably at least 5 occurrences of the destabilizing event, and to vertically stack the data so collected. The effect of so collecting such additional data sets is that controller 32 will then have additional data points for the respective numbered work pieces. Thus, for the first work piece after occurrence of the destabilizing event, controller 32 has 5 data points pertaining to the first work piece passing through machine 12C after the occurrence of the respective 5 destabilizing events. For the second work piece after each occurrence of the destabilizing event, controller 32 has 5 data points pertaining to the second work piece passing through machine 12C after the occurrence of the respective 5 destabilizing events. Similarly, the controller has up to 5 data points for each of the remaining work pieces affected by the destabilizing events.

It should be understood that, while controller 32 is operating to store and vertically associate the above data sets, the controller continues to use the same or related data for horizontal analysis to compute corrective instructions to send to the respective actuators such as stepper motors 28 and transmissions 30.

A typical data set collected for a respective one destabilizing event may contain data representing any number of work pieces, from as few as 2 work pieces to as many as 200 or more work pieces, whether n is fixed or open-ended. The reason a fixed number n is preferred is because an open ended number n can consume large quantities of computing capacity and memory if the operating system remains out of tolerance or away from steady state conditions, or unstable, for a protracted period of time. Since the number of data points in each data set can be determined by how effectively the horizontal analysis brings the process back to target conditions, the respective data sets may represent different numbers of work pieces whereby some work piece numbers may contain fewer data points than the number of destabilizing events.

Regarding the range of the number n in respective data sets, for a short term, typically minor destabilizing event such as a splice, about 5 to about 20 recorded readings is typically adequate. For a longer term destabilizing event, or an event that more seriously destabilizes the system, such as start-up or shut-down, more recorded readings are preferred such as 100 or more readings.

Once data for the requisite number of data sets has been collected, and correlated in vertically stacked relationship, the data points for each work piece number are correlated so as to arrive at a representative deviation for that respective work piece number. Thus, the five 15th data points representing work pieces number 15 from the 5 data sets are correlated in order to arrive at a representative value for the deviation of the 15th work piece from the target. The correlation can be as simple as averaging the 5 deviation readings. Other correlations can as well be used, depending on what correlation is believed to best represent the five data points representing the five 15th work pieces. Thus, the correlation may be a median, or other derived number. In addition, severely aberrant deviations may be discarded before deriving the correlation result. Thus, an extremely high or extremely low deviation, compared to the remaining deviations for that work piece number, may be discarded before making the correlation.

Figure 3A:
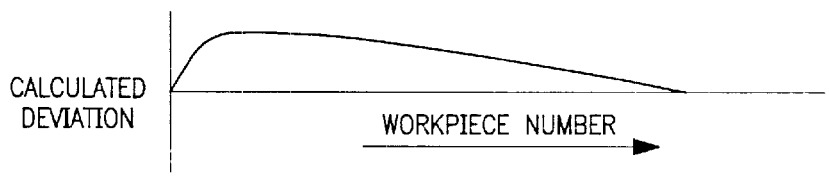
FIGS. 3A and 3B are graphs representing a first deviation profile and a first correction profile, respectively.

The result of the correlation is a calculated data set representative of the expected deviation, work piece by work piece, after occurrence of a waist band splice. The calculated data set can then be represented by a calculated deviation profile as illustrated in FIG. 3A, representative of the deviation effect when the waist band splice enters machine 12C. In FIG. 3A, and the subsequent graphs, the horizontal axis represents the work piece numbers, in ascending order starting with "0" at the origin of the graph, and incrementing 1 unit at a time until the deviation reaches a nominal amount, whereupon the process is again at or approaching target conditions. The vertical axis represents the amount of the calculated deviation.

If the definition of the destabilizing event has been properly limited, for example to waist elastic splices, and if the effect being monitored is in fact predictably repetitious, the deviations recorded for the respective work piece numbers will in general be similar to each other. By recording the data sets, one establishes the predictable repetition of the deviations of interest.

Where the deviations are repetitious, work piece by work piece, the calculated deviation profile can then be used to apply a correction profile to the next occurrence of the destabilizing event of interest, namely, in this example, to the next occurrence of a splice in the strip of waist band material. The first step in creating the correction profile is to modify the deviation profile. In general, the deviation profile is first inverted as illustrated in FIG. 4A. The inverted deviation profile can in some cases be used as is, as a correction profile element, and added to the previous correction profile. In this example, there is no previous correction profile. Thus, for purpose of illustrating the process, a null correction profile is illustrated as FIG. 3B.

Figure 4A:
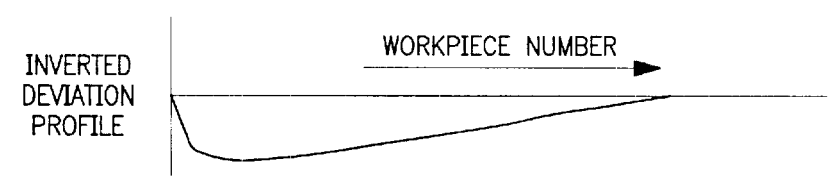
FIG. 4A is a graph representing an invert of the deviation profile of FIG. 3A.
Figure 4B:
FIG. 4B is a graph representing a new correction profile element derived from the invert graph of FIG. 4A.

Typically, though not always, the inverted deviation profile is further modified before being applied to the previous correction profile, in order to reduce the possibility that larger correction amounts may make the process unstable. Thus, the inverted correction profile is typically multiplied by a fractional factor, or some other desirable correction factor to arrive at the correction profile element as illustrated in FIG. 4B. In this example, the inverted deviation profile of FIG. 4A has been multiplied by a fractional factor of about $\frac{2}{3}$ to arrive at the correction profile element of FIG. 4B. The optimum fractional factor can vary widely, and is generally based on the degree of consistency, from data set to data set, of the data collected as the deviation profile.

Figure 3B:
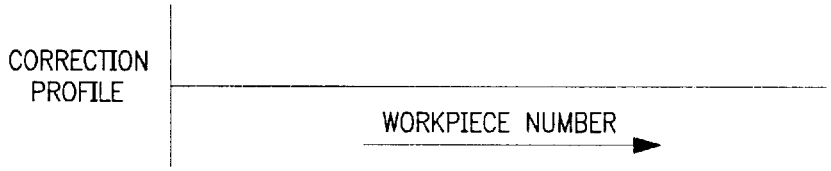
Figure 4C:
FIG. 4C is a graph representing a new correction profile made by combining the correction profile of FIG. 3B and the correction profile element of FIG. 4B.

The correction profile element of FIG. 4B is then added to the previous correction profile, in this case the null profile of FIG. 3B, to obtain the new correction profile, FIG. 4C.

The new correction profile is then applied to work pieces subsequently traversing machine 12C upon the next occurrence of a splice in the waist band elastic material. Similarly, as to other destabilizing events, the correction profile is applied to whatever machine, machines, or otherwise defined work stations the deviation data was derived from.

When the next splice of waist band elastic material is detected by sensor 24B, controller 32 implements the invention. Accordingly, controller 32 sends adjustment instructions to the respective actuator corresponding to the adjustments represented in the correction profile of FIG. 4C, Namely, considering the number of work pieces used in developing the correction profile of FIG. 4C, the correction profile can include an individual adjustment instruction for each such numbered work piece traversing machine 12C. Thus, controller 32 can send an adjustment instruction to an actuator, for example transmission 30 or stepper motor 28A, instructing a specific adjustment for work piece number 1, then another instruction for work piece number 2, then yet another instruction for work piece number 3, and so on until all work pieces represented in the correction profile have been adjusted as they traverse machine 12C. The respective actuator makes the adjustment for each work piece.

However, in preferred embodiments, controller 32 sends adjustment instructions at spaced intervals of z work pieces, for example every second work piece or every third work piece. Where adjustment instructions are sent for less than every work piece, the recording of readings can correspondingly be reduced, unless needed for horizontal analysis, such that readings are recorded for only those work piece numbers for which adjustment instructions will ultimately be sent. Thus, readings may be recorded for the first, third, fifth, seventh, etc. work pieces, and adjustment instructions sent for the first, third, fifth, seventh, etc. work pieces.

To the extent the affect of the destabilizing event on the work pieces is the same as the affect of the destabilizing events that were used to develop the correction profile, and assuming the full invert of the deviation profile is applied as the correction profile, the applying of the correction profile reduces or eliminates the deviations from target. To the extent the affect is different, or less than the full invert of the deviation profile is applied as the correction profile, the benefit of the correction profile may be less.

Figure 4D:
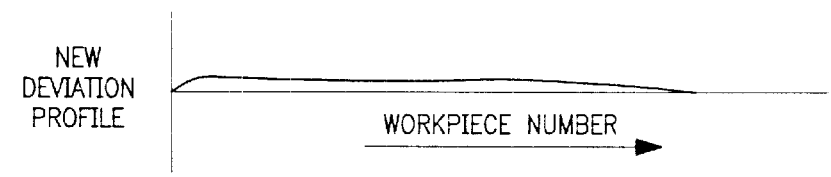
FIG. 4D is a deviation profile generated when controlling the process using the correction profile of FIG. 4C, in response to a subsequent destabilizing event.

In this example, we assume that the affect of the new destabilizing event is the same as the affect of an earlier such destabilizing event. Thus, the application of the correction profile reduces the deviation by approximately $\frac{2}{3}$, which is the multiplication factor applied to the invert of the deviation profile in FIG. 4C. As with all work pieces traversing machine 12C, the registration deviations of the respective work pieces are sensed by sensor 24B and transmitted to controller 32 through e.g. communication line 40. Controller 32 develops a new deviation profile based on the deviations sensed by sensor 24B. The new deviation profile, with the approximate ⅔ reduction compared to FIG. 3A, is seen in FIG. 4D.

While controller 32 is making the pro-active registration adjustments according to the above-described vertical analysis, the controller may optionally also be continuing the usual horizontal analysis and sending of corresponding instructions to appropriate actuators based on the horizontal analysis. To the extent controller 32 develops instructions based on both horizontal and vertical analysis, to be sent to the same actuator, the instructions sent to manufacturing line 10 can represent a combination of the horizontal and vertical instructions. Thus, controller simultaneously develops and implements instructions based on both horizontal and vertical analysis.

The instructions received by the actuators, then, can represent a pro-active vertical component based on the affect of previous occurrences of the destabilizing event, and a reactive horizontal component based on the affect of the current destabilizing event. In the instructions to the first few such work pieces, the vertical component will reference conditions associated with destabilizing events, while the horizontal component will represent the previous steady state condition, until controller 32 has received enough data to develop a horizontal response, such as an average, based on the current destabilizing event. Once the initial horizontal response has been developed, the horizontal and vertical components work together to overall reduce the deviations from target, to reduce the number of units of product which must be culled, and to bring the process back to steady state more quickly than using horizontal analysis alone.

The new deviation profile (FIG. 4D) indicates that correction profile 4C reduces the deviations in registration, but does not fully eliminate the registration deviations. The amount by which the correction profile of FIG. 4C does not fully eliminate the deviations is in general the quantitative expression of the deviations represented in the deviation profile of FIG. 4D.

Figure 5A:
FIG. 5A is a graph representing an invert of the deviation profile of FIG. 4D.
Figure 5B:
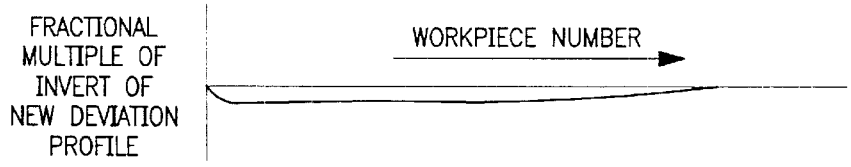
FIG. 5B is a graph representing a new correction profile element derived from the graph of FIG. 5A.

According to the invention, further modification of the correction profile of FIG. 4C can be implemented to more fully correct for the deviations experienced when such destabilizing event occurs. To that end, and referring to the pattern of FIGS. 4A–4D, FIG. 5A represents an invert of the deviations of FIG. 4D. FIG. 5B is a fractional multiple of the invert profile of FIG. 5A, and thus represents a new correction profile element. The correction profile element of FIG. 5B is then added to the existing correction profile of FIG. 4C to develop a new correction profile illustrated in FIG. 5C. For illustration purposes, the outline of the profile element of FIG. 5B is shown in dashed outline in FIG. 5C.

When the next splice of waist band elastic material is detected by sensor 24A, controller 32 again implements the vertical analysis of the invention. Accordingly, controller 32 sends adjustment instructions to e.g. a stepper motor 28 corresponding to the adjustments represented in the new correction profile of FIG. 5C. Namely, considering the number of work pieces used in developing the correction profile of FIG. 5C, the correction profile includes adjustment instructions for respective selected work pieces traversing machine 12C. Thus, controller 32 sends an adjustment instruction to an actuator instructing a specific adjustment for respective work pieces, until all work pieces represented in the correction profile have been adjusted as they traverse machine 12C.

As an adjustment instruction is received, the respective actuator implements the instructions. At typically used production speeds in personal care absorbent article technology, generally more than one work piece traverses machine 12C by the time some instructions can be fully implemented. Accordingly, controller 32 spaces the instructions at suitable intervals to provide time for the respective actuator or actuators to implement the respective instructions without inappropriately stressing the respective actuators.

As before, while controller 32 is making the pro-active registration adjustments according to the above-described vertical analysis, the controller is also continuing to perform the usual horizontal analysis and is sending corresponding instructions to appropriate actuators based on the horizontal analysis. To the extent controller 32 develops instructions based on both horizontal and vertical analysis, to be sent to the same actuator, the instruction sent typically represents a combination of the horizontal and vertical instructions. Thus, controller 32 simultaneously develops and implements instructions based on both horizontal and vertical analysis.

As with all work pieces traversing machine 12C, the registration deviations of the respective work pieces are sensed by sensor 24B and transmitted to controller 32 through e.g. communication line 40. Controller 32 develops a new deviation profile based on the deviations currently being sensed by sensor 24B. The new deviation profile, with still further reduction in deviations compared to FIG. 4D, is seen in FIG. 5D.

Figure 5C:
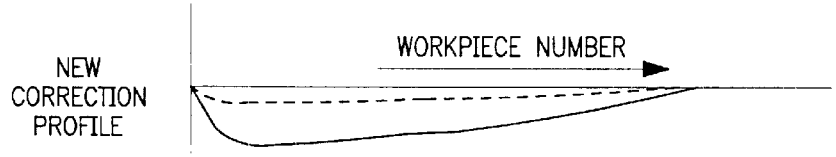
FIG. 5C is a graph representing a new correction profile made by combining the graphs of FIGS. 4C and 5B.
Figure 5D:
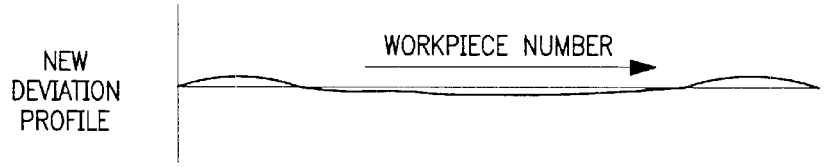
FIG. 5D is a deviation profile generated when controlling the process using the correction profile of FIG. 5C, in response to a subsequent destabilizing event.
Figure 6A:
FIG. 6A is a graph representing an invert of the deviation profile of FIG. 5D.
Figure 6B:
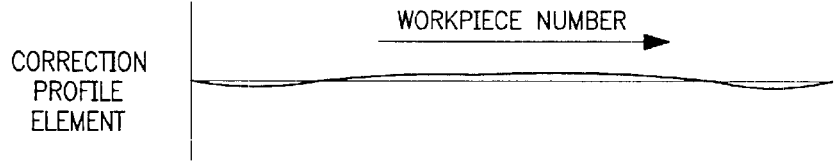
FIG. 6B is a graph representing a new correction profile element derived from the graph of FIG. 6A.

The deviation profile of FIG. 5D is mathematically inverted as in FIG. 6A, and is modified by a fractional factor of 1, whereby the values of the correction profile element illustrated in FIG. 6B is the same as the values of the invert of the deviation profile illustrated in FIG. 6A. While previous inverts of the deviation profile were reduced by fractional multiplication, the deviation values in FIG. 6A are so small as to represent minimal risk of making the operating system unstable whereby the full indicated invert values of the deviation profile can be used.

Figure 6C:
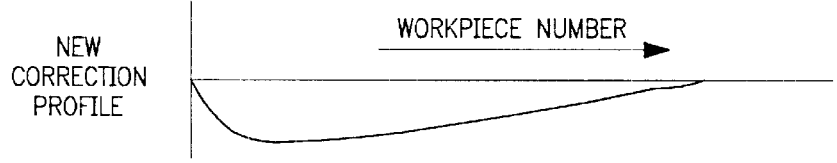
FIG. 6C is a graph representing a new correction profile made by combining the graphs of FIGS. 5C and 6B.

The correction profile element of FIG. 6B is then added to the existing correction profile of FIG. 5C, to develop the new correction profile illustrated in FIG. 6C.

When the next splice of waist band elastic material is detected by sensor 24A, controller 32 again implements the invention. Accordingly, controller 32 sends adjustment instructions to one or more actuators corresponding to the adjustments represented in the new correction profile of FIG. 6C. Namely, considering the number of work pieces used in developing the correction profile of FIG. 6C, the correction profile can include an individual adjustment instruction for each work piece traversing machine 12C. Controller 32 sends adjustment instructions, appropriately spaced in time, to the respective actuator or actuators, instructing specific adjustments for respective work pieces. The actuator or actuators make the adjustments for the respective work pieces.

As before, while controller 32 is making the pro-active registration adjustments according to the above-described vertical analysis, the controller is also continuing the usual horizontal analysis and is sending corresponding instructions to appropriate actuators based on the horizontal analysis. Thus, as before, the controller simultaneously develops and implements instructions based on both horizontal and vertical analysis.

Figure 6D:
FIG. 6D is a deviation profile generated when controlling the process using the correction profile of FIG. 6C, in response to a subsequent destabilizing event.

As with all work pieces traversing machine 12C, the registration deviations of the respective work pieces are sensed by sensor 24B and transmitted to controller 32 through communication line 40. Controller 32 develops a new deviation profile based on the deviations currently being sensed by sensor 56. The new deviation profile, with still further reduction in deviations compared to FIG. 5D, is seen in FIG. 6D.

As illustrated in the progression of FIGS. 4A–4D, 5A–5D, and 6A–6D, at each occurrence of the destabilizing event of interest, controller 32 pro-actively applies the then-current correction profile which is based on previous occurrences of the corresponding type of destabilizing event, and collects deviation data, preferably for each work piece traversing the respective machine or work station until steady state is again reached. A series of adjustments are used as in FIGS. 4C, 5C, and 6C, in developing and testing the correction profile in order that the deviation profile be properly minimized, while controlling potential for an unstable operating process.

The above description relates to only one of many parameters which can be affected simultaneously by a destabilizing event. Controller 32 can, as desired, be programmed to pro-actively respond, according to vertical analysis, to any or each of the respective parameters so affected. Thus, controller 32 can be simultaneously responding pro-actively to multiple such off-target parameters, while optionally also responding simultaneously reactively, with horizontal analysis of the same parameters.

The above description suggests that the correction profile is up-dated after each occurrence of the destabilizing event of interest. And indeed, the correction profile may be up-dated thereafter. However, a preferred implementation of the concepts of the invention contemplates retaining the correction profile unchanged until a new compilation of data sets has been collected. Thus, where data sets 1–5 are used to develop the first correction profile, data sets 6–10 are used to compile a new correction profile element while the existing correction profile is being used to make adjustments during destabilizing events 6–10, and before any changes are made to the correction profile being used. The correction profile element based on data sets 6–10 is then combined with the existing correction profile and used for destabilizing events 11–15 while 5 new deviation data sets are collected. The deviation data sets from destabilizing events 11–15 are then used to develop a correction profile element which is combined with the correction profile element used during destabilizing events 11–15, and the up-dated correction profile is used during destabilizing events 16–20.

The number of data sets used to develop a correction profile or correction profile element is quite variable and can be determined by the user, generally based on the consistency of the data and the comfort level of the user that the data is representative of the process conditions.

While stepper motors 28 and transmissions 30 have been illustrated as the actuators through which controller 32 makes registration adjustments, other actuators can be used as appropriate.

The above example illustrates a splice as the destabilizing event which does not grossly affect line speed. The invention can be applied to any destabilizing event wherein the response of interest in respective work pieces or other product is relatively consistent for repeated occurrences of the destabilizing event. The invention is especially valuable where the destabilizing event Is accompanied by gross changes in line speed. For example, line speed is grossly affected at start-up and shut-down. In such cases, by the time the horizontal analysis has sensed enough work pieces to arrive at an averaged or like deviation, the line speed may have changed so much that the correction computed from such readings may be inconsistent with the since-changed line speed. In such case, the record of the ongoing changes of line speed, applied in the vertical analysis and correction instructions, may be of great value in arriving at correction instructions which are more effective in terms of the dynamically changing line speed than are instructions based solely on horizontal analysis.

The scope of the definition of a type of destabilizing event depends at least in part on being able to reasonably predict a convergence of the deviations for each work piece number, from destabilizing event to destabilizing event. Thus, a first type of work piece deviation might occur consistently for all start-ups as destabilizing events. A second type of work piece deviation might occur consistently for all shut-downs as destabilizing events. A third type of work piece deviation might occur consistently for all waist elastic splices as destabilizing events. The data from each different type of destabilizing event is likely to be different, while being internally consistent so long as related to the same type of destabilizing event.

As used herein, a "destabilizing event" may represent a short period of time, for example a second or two, such as when a splice enters the process. However, a "destabilizing event" can also represent a temporary event that takes a longer period to play out, or pass through the system, such as a start-up or a shut-down. The length of time over which the "event" occurs is not so important as is the temporary nature of the event in combination with the fact that the event does not represent target characteristics or steady state characteristics. Thus, a destabilizing event may represent several minutes of process operation, or longer.

The thrust of the invention is correction of deviations in work pieces which are being processed while being affected by a destabilizing event. For example, splices generally do not require any change in line speed, though some number of units of product are typically culled. The issue addressed by the invention is not how many units of product should be culled. Rather, the issue is reducing the number of units to be culled by pro-actively correcting for anticipated deviations which predictably occur when a particular type of destabilizing event occurs.

Accordingly, two quite different sets of operating conditions can be defined. The first set of operating conditions exists during steady state operation of the process. Product produced under this first set of steady state conditions has a relatively low risk of containing defective units of product, and is thus sampled according to steady state assumptions and controlled according to steady state-based horizontal analysis.

The second set of operating conditions represents destabilizing events as illustrated herein. Product produced under the influence of destabilizing events has a relatively high risk of containing defective units of product according to a predictable set of deviations. In order to reduce the number of cull units of product, units of product produced under the second set of operating conditions are sampled and controlled according to a combination of horizontal and vertical analysis as described above.

Thus, using the vertical analysis methods of the invention typically results in fewer cull units being associated with destabilizing events, and gets the process back to approximately target conditions more quickly than using horizontal analysis alone.

A significant advantage of the vertical analysis methods of the invention is that the correction profile is regularly and automatically up-dated, without operator intervention, at each specified number of occurrences of a respective type of destabilizing event. Thus, control system 22 automatically adapts to ongoing changes in manufacturing line activity such as wear and tear on the machines 12, and ongoing changes in the raw material inputs, and automatically and regularly develops suitable correction profiles when newly installed on a machine. Thus, once set up, control system 22, in general, can be implemented on any manufacturing line manufacturing the same product using similar raw material. Namely, the control methods discussed here generally are not machine specific, are not manufacturing line specific, and are not specific to a particular raw material. Rather, control system 22 continually monitors the operation of the process and at pre-determined intervals up-dates the correction profile, whereby the pro-active correction profile is regularly up-dated in accord with changing process conditions.

As illustrated in the example, the regular up-dating of the correction profile is not based on any calendar measure of time, or any measure of the number of work pieces traversing the manufacturing line, but is rather based on the frequency of occurrence of the destabilizing event of interest, whereby the frequency of up-dating of the correction profile is based on the frequency of use of the correction profile in making pro-active corrections.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A method of controlling a process producing units of product and wherein a destabilizing event of a particular type periodically destabilizes the process, resulting in a deviation from a target parameter in a number of units of the product, from unit number 1 to unit number n, the method comprising:
   (a) upon occurrence of the particular type of destabilizing event, by vertical analysis, associating with respective ones of the n units of product, deviation amounts corresponding to historical deviation amounts for the respective so-numbered units of product in past occurrences of the particular type of destabilizing event; and
   (b) applying to selected nth ones of the n units of product, correction factors, based on vertical analysis and derived from respective associated historical deviation amounts for the respective nth units of product,
thereby making pro-active adjustments to respective ones of the n units of product, upon occurrence of the destabilizing event.

2. A method as in claim 1, including applying the correction factors to each of the n units of product.

3. A method as in claim 1, including applying the correction factors as registration correction factors, to with machine direction registration.

4. A method as in claim 1, including applying the correction factors as registration correction factors, to cross machine direction registration.

5. A method as in claim 1, including, using a computing controller, computing correction factors for selected units, using historical operating data from at least two previous occurrences of the destabilizing event and respectively developing a correction profile using the combination of the correction factors, for use upon occurrence of a future destabilizing event.

6. A method as in claim 5, including
   collecting and recording data for respective ones of the subsequent n units of product, and thereby obtaining fresh deviation data on multiple units of product, up to n units, for the destabilizing event, thus obtaining samples for up to n units of product,
   for respective ones of the n units of product, using the computing controller, automatically in real time computing a representative deviation based on the sample obtained for the respective nth unit of product, and thereby obtaining a deviation profile representative of the respective units of product associated with the respective destabilizing event,
   combining and/or modifying up to 10 of the deviation profiles, and thereby obtaining a representative composite correction profile up-date element for such type destabilizing event,
   upon obtaining the correction profile up-date element, adding the so-obtained correction profile up-date element to the correction profile, thus to obtain an up-dated correction profile, and
   applying the up-dated correction profile to a subsequent occurrence of the respective type destabilizing event.

7. A method as in claim 6, including beginning to add the so-obtained correction profile update element to the correction profile no later than the n+10th unit of the last destabilizing event from which the correction profile element data was derived.

8. A method as in claim 5, including computing separate and distinct correction factors for selected units to which such registration correction factor is applied, including deriving each such correction factor from the same numbered nth unit in the previous destabilizing event or events, whereby each such correction factor is based on data derived from the respective nth unit of product past the destabilizing event, in such previous destabilizing event or events.

9. A method as in claim 5, including, using a computing controller, computing correction factors for units evenly spaced in terms of unit number, using historical operating data from at least two previous occurrences of the destabilizing event and respectively developing a correction profile using the combination of the correction factors, for use upon occurrence of a future destabilizing event.

10. A method as in claim 5, including, using a computing controller, computing correction factors for each unit, using historical operating data from at least two previous occurrences of the stabilizing event and respectively developing a correction profile using the combination of the correction factors, for use upon occurrence of a future destabilizing event.

11. A method as in claim 5, including
   collecting and recording registration data for respective ones of the subsequent n units of product, and thereby obtaining fresh registration deviation data on multiple units of product, up to n units, for the destabilizing event, thus obtaining samples for up to n units of product,
   for respective ones of the n units of product, using the computing controller, automatically in real time computing a representative registration deviation based on the sample obtained for the respective nth unit of product, and thereby obtaining a registration deviation profile representative of the respective units of product associated with the respective destabilizing event, combining and/or modifying the deviation profile, and thereby obtaining a representative correction profile up-date element for such type destabilizing event, upon obtaining the correction profile up-date element, adding the so-obtained correction profile up-date element to the registration correction profile, no later than the 2 nth unit of the last destabilizing event from which the correction profile element data was derived, thus to obtain an up-dated registration correction profile, and applying the up-dated registration correction profile to a subsequent occurrence of the respective type destabilizing event.

12. A method as in claim 5, including collecting deviation information from ones of the respective n units of product during subsequent occurrences of the destabilizing event and, based on the deviation information so collected, periodically making adjustments to the correction profile and applying the adjusted correction profile to ones of the respective n units of product at future occurrences of the destabilizing event.

13. A method as in claim 5, including collecting and recording registration data for respective ones of the subsequent n units of product, and thereby obtaining fresh registration deviation data on multiple units of product, up to n units, for the destabilizing event, thus obtaining samples for up to n units of product, for respective ones of the n units of product, using the computing controller, automatically in real time computing a representative registration deviation based on the sample obtained for the respective nth unit of product, and thereby obtaining a registration deviation profile representative of the respective units of product associated with the respective destabilizing event, combining and/or modifying up to 20 of the deviation profiles, and thereby obtaining a representative composite correction profile up-date element for such type destabilizing event, upon obtaining the correction profile up-date element, adding the so-obtained correction profile up-date element to the registration correction profile, thus to obtain an up-dated registration correction profile, and applying the up-dated registration correction profile to a subsequent occurrence of the respective type destabilizing event.

14. A method as in claim 13, including beginning to add the so-obtained correction profile up-date element to the correction profile no later than the n+20th unit of the last destabilizing even from which the correction profile element data was derived.

15. A method as in claim 1, including, using a computing controller, computing correction factors for units evenly spaced in terms of unit number, using historical operating data from at least previous occurrences of the destabilizing event and respectively developing a correction profile using the combination of the correction factors, for use upon occurrence of a future destabilizing event.

16. A method as in claim 1, including, using a computing controller, computing correction factors for each unit, using historical operating data from at least two previous occurrences of the destabilizing event and respectively developing a correction profile using the combination of the correction factors, for use upon occurrence of a future destabilizing event.

17. A method as in claim 1, applied to a manufacturing process producing discrete units of absorbent articles for personal care use in absorbing body exudates.

18. A method of controlling a process producing discrete units of absorbent article product for personal care use and wherein a destabilizing event of a particular type periodically destabilizes the process, resulting in a deviation from a target parameter in a number of units of the product, from unit number 1 to unit number n, the method comprising:

(a) operating the process, including continuing to operate the process upon occurrence of such type destabilizing events, x times, x being greater than 1, and upon occurrence of such destabilizing events, collecting and recording product data for respective ones of the subsequent n units of product, and thereby obtaining product deviation information on multiple units of product, up to n units of product, for each of the x such destabilizing events, thus obtaining up to x samples for each of the n units of product;

(b) for respective ones of the n units of product, computing a representative product deviation based on the samples obtained for the respective nth unit of product, from the x such destabilizing events, and thereby obtaining a product deviation profile representative of the product deviations of the respective units of product from a target parameter, and obtained from the x destabilizing events;

(c) modifying the deviation profile, and thereby obtaining a product correction profile element for such type destabilizing event, the correction profile including a correction for each of the n units of product for which a product deviation indication was obtained, specific to historical deviations of that nth unit of product;

(d) adding the so-obtained product correction profile to any pre-existing product correction profile used in collecting the sample, thus to obtain an up-dated product correction profile; and (e) applying the up-dated product correction profile to a subsequent occurrence of the respective type destabilizing event.

19. A method as in claim 18 including, while applying the up-dated product correction profile to a subsequent such destabilizing event, collecting product deviation data for up to respective n units of product, and using the so-collected deviation data to further up-date the product correction profile.

20. A method as in claim 18, the computing of the product deviations comprising averaging the deviations recorded for the respective nth units of product.

21. A method as in claim 18, including collecting product deviation information from ones of the respective n units of product during subsequent occurrences of the destabilizing event, and periodically making adjustments to the product correction profile based on the product deviation information so collected.

22. A method as in claim 18, including applying the product correction profile to each of the n units of product.

23. A method as in claim 18 wherein the product deviation is registration and the product correction profile is a registration correction profile.

24. A method as in claim 23, including applying the registration correction profile to with machine direction registration.

25. A method as in claim 23, including applying the registration correction profile to cross machine direction registration.

26. A method of controlling a process producing product in discrete product segments, the method comprising:

(a) operating the process, including continuing to operate the process upon occurrence of a destabilizing event, and collecting and recording process performance data for respective ones of the subsequent n units of product, and thereby obtaining process performance deviation information on multiple units of product, up to n units of product, for such destabilizing event, thus obtaining samples of the performance data for up to the n units of product;

(b) for respective ones of the n units of product, computing a representative performance deviation based on the sample obtained for the respective unit of product, and thereby obtaining a process performance deviation profile representative of the respective units of product which are produced proximate the destabilizing event;

(c) modifying the deviation profile, and thereby obtaining a process performance correction profile element for the destabilizing event, including correction specifically directed to each of the n units of product for which a process performance deviation indication was obtained, specific to historical deviations of that nth unit of product based on vertical analysis;

(d) incorporating the so-obtained performance correction profile element into any pre-existing correction profile used in collecting the samples and based on vertical analysis, thus to obtain an up-dated performance correction profile based on vertical analysis; and (e) applying the up-dated performance correction profile to a subsequent occurrence of respective type destabilizing event wherein each correction profile data point is based on the nth unit of product in a plurality of historical destabilizing events of the respective type.

27. A method as in claim 26, including applying the performance correction profile to each of the n units product.

28. A method as in claim 26, including applying the performance correction profile to with machine direction registration.

29. A method as in claim 26, including applying the performance correction profile to cross machine direction registration.

30. Apparatus for controlling a process producing segments of product and wherein a destabilizing event of a particular type periodically destabilizes the process, resulting in a deviation from a target parameter in a number of segments of the product, from segment number 1 to segment number n, said apparatus comprising:

(a) a manufacturing line comprising a plurality of machines manufacturing the product;

(b) a computing controller effective, upon occurrence of the particular type of destabilizing event, to associate with respective ones of the n segments of product, deviation amounts corresponding to historical deviation amounts for the respective so-numbered segments of product of segment number 1 to segment number n, according to vertical analysis, in past occurrences of the particular type of destabilizing event, and to apply to respective nth ones of the n segments of product, correction factors derived from respective associated historical deviation amounts for the respective nth segments of product at least in part in accord with such vertical analysis;

(c) one or more detection devices detecting one or more parameters with respect to the process or product being produced by the process; and (d) one or more actuation devices effecting adjustments to the machines in response to the correction factors developed from deviation amounts detected in one or more previous destabilizing events, thereby to make pro-active adjustments to respective ones of the n segments of product, upon occurrence of the destabilizing event, based on vertical analysis of the n segments of product.

* * * * *